(12) United States Patent
Yu

(10) Patent No.: US 10,228,563 B2
(45) Date of Patent: Mar. 12, 2019

(54) OPTICAL MEDIUM, GLASSES AND IMAGING METHOD THEREFOR

(71) Applicant: BOE TECHNOLOGY GROUP CO., LTD., Beijing (CN)

(72) Inventor: Shuxin Yu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 275 days.

(21) Appl. No.: 15/121,765

(22) PCT Filed: May 11, 2015

(86) PCT No.: PCT/CN2015/078677
§ 371 (c)(1),
(2) Date: Aug. 25, 2016

(87) PCT Pub. No.: WO2016/086600
PCT Pub. Date: Jun. 9, 2016

(65) Prior Publication Data
US 2017/0017081 A1 Jan. 19, 2017

(30) Foreign Application Priority Data

Dec. 2, 2014 (CN) .......................... 2014 1 0721410

(51) Int. Cl.
G02B 27/01 (2006.01)
H04N 13/398 (2018.01)
(Continued)

(52) U.S. Cl.
CPC .......... *G02B 27/0172* (2013.01); *G02B 5/30* (2013.01); *G02B 5/3041* (2013.01);
(Continued)

(58) Field of Classification Search
None
See application file for complete search history.

(56) References Cited

U.S. PATENT DOCUMENTS 8,330,911 B2 * 12/2012 Hong .................. G02B 5/3041
349/117
9,383,492 B2 * 7/2016 Hatanaka ............ G02B 5/3016
(Continued)

FOREIGN PATENT DOCUMENTS

CN 101542356 A 9/2009
CN 101846799 A 9/2010
(Continued)

OTHER PUBLICATIONS

International Search Report and Written Opinion from PCT Application Serial No. PCT/CN2015/078677, dated Sep. 9, 2015, 12 pages.
(Continued)

*Primary Examiner* — Thai Q Tran
*Assistant Examiner* — Christopher Braniff
(74) *Attorney, Agent, or Firm* — Kinney & Lange, P.A.

(57) ABSTRACT

Embodiments of the present disclosure provide an optical medium, for enabling increase in the viewing field angle without increasing a thickness of a device. The optical medium includes: a substrate having an upper interface and a lower interface parallel to each other; a first anisotropic partially-reflective film and a second anisotropic partially-reflective film being parallel to each other and arranged between the upper interface and the lower interface of the substrate in an inclined way; and a total reflection film arranged within the substrate in a direction of inclination opposite to that of the first and second anisotropic partially-reflective films. Embodiments of the present disclosure further provide glasses including the optical medium and an imaging method for the glasses.

16 Claims, 5 Drawing Sheets

(51) Int. Cl.
  *H04N 13/337* (2018.01)
  *G02B 5/30* (2006.01)
  *G02B 27/28* (2006.01)
  *G06F 3/0346* (2013.01)
  *H04N 13/04* (2006.01)

(52) U.S. Cl.
  CPC ........... *G02B 5/3083* (2013.01); *G02B 27/01* (2013.01); *G02B 27/28* (2013.01); *H04N 13/044* (2013.01); *H04N 13/337* (2018.05); *H04N 13/398* (2018.05); *G02B 2027/014* (2013.01); *G02B 2027/0123* (2013.01); *G02B 2027/0125* (2013.01); *G02B 2027/0178* (2013.01); *G06F 3/0346* (2013.01)

(56) References Cited

U.S. PATENT DOCUMENTS

2008/0151379 A1* 6/2008 Amitai ................. G02B 6/0055
  359/630
2009/0122414 A1 5/2009 Amitai

FOREIGN PATENT DOCUMENTS

| | | |
|---|---|---|
| CN | 102906623 A | 1/2013 |
| CN | 103869467 A | 6/2014 |
| CN | 103885184 A | 6/2014 |
| CN | 203673146 A | 6/2014 |
| CN | 203786400 U | 8/2014 |
| CN | 104360484 A | 2/2015 |
| WO | WO2006/085308 A1 | 8/2006 |
| WO | WO2007/054928 A1 | 5/2007 |

OTHER PUBLICATIONS

First Chinese Office Action from Chinese Patent Application No. 2014107214105, dated Apr. 26, 2016, 9 pages.

Second Chinese Office Action including English translation dated Nov. 3, 2016, for corresponding Chinese Application No. 201410721410.5.

* cited by examiner

OPTICAL MEDIUM, GLASSES AND IMAGING METHOD THEREFOR

CROSS-REFERENCE TO RELATED APPLICATION

This application claims the benefit of Chinese Patent Application No. 201410721410.5 filed on Dec. 2, 2014 in the State Intellectual Property Office of China, the whole disclosure of which is incorporated herein by reference.

BACKGROUND OF THE INVENTION

Field of the Invention

The present disclosure relates to the field of display technologies, and more particularly, to an optical medium, glasses comprising the optical medium and an imaging method for the glasses.

Description of the Related Art

Intelligent glasses is a generic term for a glasses having an independent operation system, being capable of being loaded and installed therein programs such as customer software, games and the like provided by a software provider and achieving, through voice or action operations, functions such as adding schedule, map navigation, interaction with close friends, taking photos and videos, video communication with friends and the like, and enabling wireless network access through a mobile communication network.

In prior arts, an intelligent glasses generally comprises a horizontal frame capable of being transversely placed above a bridge of a nose, a wide strip-shaped computer located at a right side of the frame and a transparent display screen. FIG. 1 shows a structure and a light path principle diagram of an optical module device of the transparent display screen, where an array of light emitting diodes (LEDs) is arranged to provide backlight P to a Liquid Crystal on Silicon (LCoS) module, which converts a source image into a light signal S, then the light signal S is transmitted to a human eye at a visual observation side S2 via a reflection surface of a semi-transparent and semi-reflective beam splitter 1, a transmission surface of a partial-reflector 2, a reflection surface of a reflector 3 and a reflection surface of the partial-reflector 2. Light beam V at an environment scene side S1 is transmitted to the human eye at the visual observation side S2 via the transmission surface of the partial-reflector 2, and a viewing field angle at the visual observation side S2 is θ. For the above product design, its disadvantage is in that the viewing field angle θ of the optical module device is smaller and the thickness of the optical module device needs to be increased if a larger viewing field angle is desired.

SUMMARY

In order to solve the above and other not-mentioned problems in prior arts, embodiments of the present disclosure provide an optical medium, glasses comprising the optical medium and an imaging method for the glasses, for enabling increase in the viewing field angle without increasing the thickness of the device.

According to a first aspect of the present disclosure, there is provided an optical medium, comprising:

a substrate having an upper interface and a lower interface parallel to each other;

a first anisotropic partially-reflective film and a second anisotropic partially-reflective film being parallel to each other and tilted between the upper interface and the lower interface of the substrate; and a total reflection film arranged within the substrate and titled in a direction opposite to that of the first and second anisotropic partially-reflective films;

wherein the first anisotropic partially-reflective film is configured to totally reflect light having a first polarization state and to transmit light having a second polarization state different from the first polarization state, and the second anisotropic partially-reflective film is configured to transmit light having the first polarization state and to totally reflect light having the second polarization state; and wherein the total reflection film is arranged to receive incident light and totally reflect the incident light, such that the incident light is transmitted within the substrate to the first anisotropic partially-reflective film and the second anisotropic partially-reflective film through reflection on an inner side of the upper interface and an inner side of the lower interface of the substrate.

According to a second aspect of the present disclosure, there is further provided glasses, comprising: the above optical medium, a detection device and a position processor;

wherein the detection device is configured to detect a screen position based on a screen image; and the position processor is configured to generate position information of an imported content based on the screen position detected by the detection device so as to output the imported content to the optical medium based on the position information, a position of the imported content being fixed relative to the screen position.

According to a third aspect of the present disclosure, there is further provided an imaging method for the above glasses, comprising:

detecting the screen position based on the screen image; and generating the position information of the imported content of the glasses based on the screen position so as to output the imported content to the optical medium of the glasses based on the position information, a position of the imported content being fixed relative to the screen position.

BRIEF DESCRIPTION OF THE DRAWINGS

In the following, in order to make technical solutions of embodiments of the present disclosure more clear, figures which are used in description of the embodiments or prior arts will be briefly introduced. Obviously, the figures described in the following only illustrate some of the embodiments of the present disclosure, and other figures may be obtained from these figures by those skilled in the art without exercising any inventive skill.

DETAINED DESCRIPTION OF PREFERRED EMBODIMENTS OF THE INVENTION

Technical solutions in embodiments of the present disclosure will be further described clearly and fully in combination with exemplary embodiments with reference to the attached drawings. Obviously, the described embodiments are only a part, rather than all, of embodiments of the present disclosure. Based on the embodiments of the present disclosure, all of other embodiments obtained by those skilled in the art without any creative work will fall within the scope of the present invention.

It will be understood that in description of the present disclosure, orientation or position relationships indicated by terms "central", "upper", "lower", "front", "rear", "left", "right", "vertical", "horizontal", "top", "bottom", "inner", "outer" and the like are what shown in the figures and only intended for convenience and simplification in description of the present disclosure, but do not indicate or imply that the mentioned devices or elements should have particular orientations, be configured and operated in particular orientations, and thus should not be interpreted as being limitative to the present invention.

Figure 1:
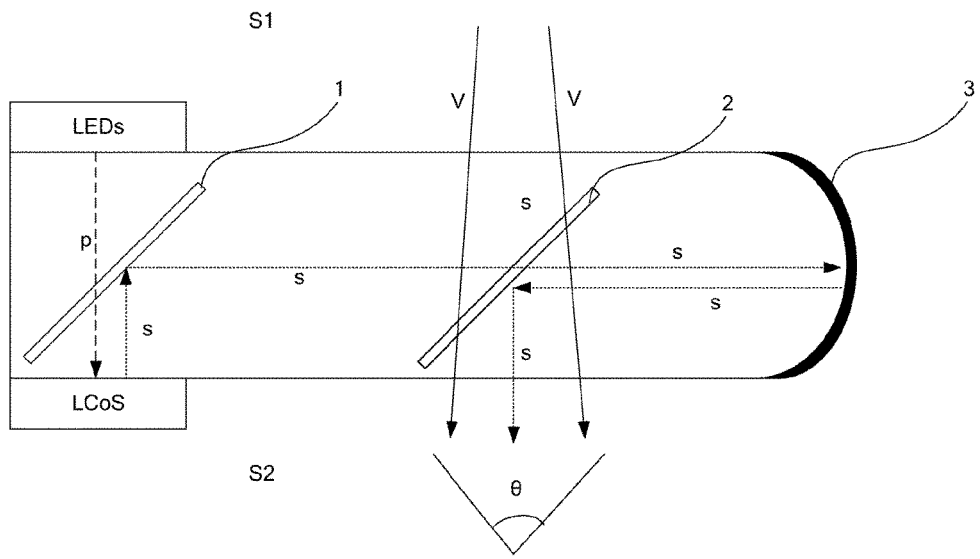
FIG. 1 is a schematic diagram showing a structure and a light path principle of an optical module device of intelligent glasses in prior arts.
Figure 2:
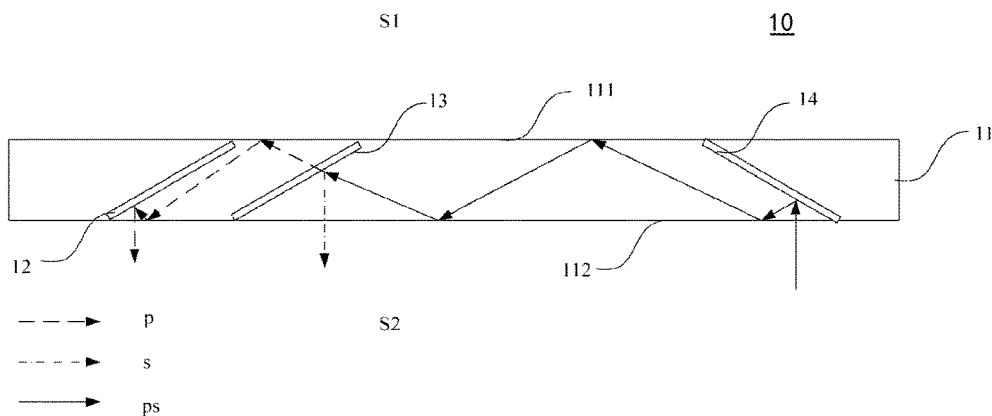
FIG. 2 is a structural schematic diagram of an optical medium for general viewing/watching according to an embodiment of the present disclosure.

With reference to FIG. 2, there is shown a structural schematic diagram of an optical medium 10 for general viewing according to an embodiment of the present disclosure. The optical medium 10 comprises:

a substrate 11 having an upper interface 111 and a lower interface 112 parallel to each other;

a first anisotropic partially-reflective film 12 and a second anisotropic partially-reflective film 13 being parallel to each other and titled between the upper interface 111 and the lower interface 112 of the substrate 11; and a total reflection film 14 arranged within the substrate 11 and titled in a direction opposite to that of the first and second anisotropic partially-reflective films 12 and 13;

wherein the first anisotropic partially-reflective film 12 is configured to totally reflect light having a first polarization state and to transmit light having a second polarization state different from the first polarization state, and the second anisotropic partially-reflective film 13 is configured to transmit light having the first polarization state and to totally reflect light having the second polarization state; and wherein the total reflection film 14 is arranged to receive incident light and totally reflect the incident light, such that the incident light is transmitted within the substrate 11 to the first anisotropic partially-reflective film 12 and the second anisotropic partially-reflective film 13 through reflection on an inner side of the upper interface 111 and an inner side of the lower interface 112 of the substrate 11.

In one preferred embodiment, the first polarization state and second polarization state are "perpendicular to" each other; for example, lights having the first polarization state and the second polarization state may be p polarized light and s polarized light with a phrase difference of 90° therebetween. In an embodiment, the first anisotropic partially-reflective film 12 and the second anisotropic partially-reflective film 13 may include/adopt wire grid polarization beam splitters, which may reflect s polarized light of isotropic incident light and transmit p polarized light of the isotropic incident light, or may reflect p polarized light of isotropic incident light and transmit s polarized light of the isotropic incident light. In addition, with reference to FIG. 2, an outer side of the upper interface 111 of the substrate is an environment scene side S1, an outer side of the lower interface 112 is a visual observation side S2, a viewer located at the visual observation side S2 may view the environment scene side S1 by receiving light transmitted from the environment scene side S1 via the optical medium. In the optical medium according to the embodiment of the present disclosure, since the first anisotropic partially-reflective film and the second anisotropic partially-reflective film are arranged to be parallel to each other within the substrate in an inclined way, light reflected by the total reflection film and having different polarization states can be reflected respectively by the first anisotropic partially-reflective film and the second anisotropic partially-reflective film to the viewer, thereby a viewing field angle range is increased; meanwhile, since the first anisotropic partially-reflective film and second anisotropic partially-reflective film are arranged to be parallel to each other, the thickness of the device will not be increased.

In an embodiment, in order to obtain a larger viewing field angle range, a projection of the first anisotropic partially-reflective film 12 on the upper interface 111 of the substrate 11 does not coincide with that of the second anisotropic partially-reflective film 13 on the upper interface 111 of the substrate 11.

Further, since when light is transmitted to the second anisotropic partially-reflective film 13, only the light having the second polarization state will be reflected to the viewer, and light having the first polarization state is transmitted to the first anisotropic partially-reflective film 12 and reflected to the viewer, light having different polarization states may be reflected to the viewer after being separated by the optical medium according to embodiments of the present disclosure, thereby avoiding generation of a double image.

Figure 3:
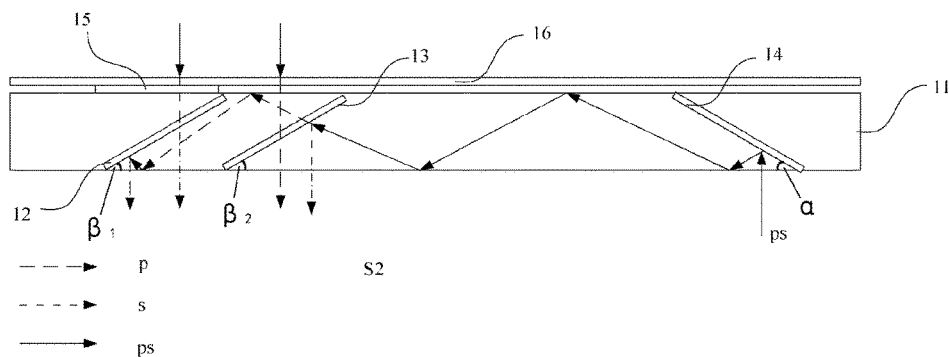
FIG. 3 is a structural schematic diagram of an optical medium for polarized 3D video viewing according to another embodiment of the present disclosure.
Figure 4:
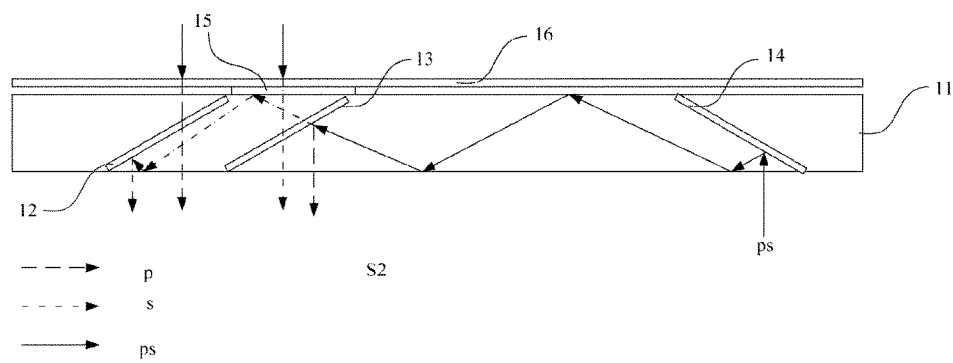
FIG. 4 is a structural schematic diagram of an optical medium for polarized 3D video viewing according to a further embodiment of the present disclosure, showing a structural schematic diagram of the optical medium for a right eye.
Figure 5:
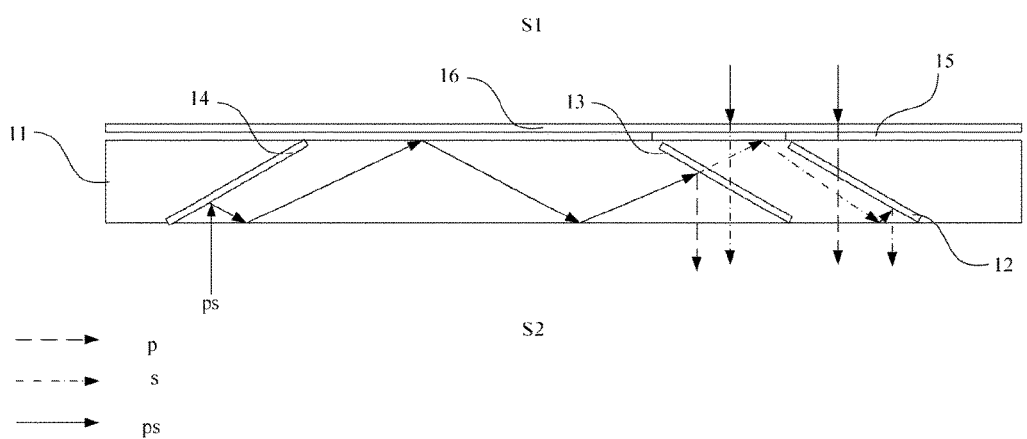
FIG. 5 is a structural schematic diagram of an optical medium for a left eye, corresponding to that shown in FIG. 4.

Further with reference to FIGS. 3-5, FIG. 3 is a structural schematic diagram of an optical medium for polarized 3D video viewing according to another embodiment of the present disclosure, FIG. 4 is a structural schematic diagram of an optical medium for polarized 3D video viewing according to a further embodiment of the present disclosure, showing a structural schematic diagram of the optical medium for a right eye, and FIG. 5 is a structural schematic diagram of an optical medium for a left eye, corresponding to that shown in FIG. 4.

In order to be suitable for polarized 3D video viewing, according to an embodiment of the present disclosure, the optical medium further includes: a half wave plate 15 arranged on the outer side of the upper interface 111, a projection of the first anisotropic partially-reflective film 12 or the second anisotropic partially-reflective film 13 on the upper interface 111 coinciding with the half wave plate 15; and a polarizer 16 arranged on the half wave plate 15 and covering the outer side of the upper interface 111.

When the optical medium is used for 3D video viewing, the polarizer for the left eye has a polarizing angle different from that of the polarizer for the right eye. Preferably, the polarizing angle of the polarizer for the left eye is perpendicular in phrase to that of the polarizer for the right eye. The first anisotropic partially-reflective film 12 and the second anisotropic partially-reflective film 13 can transmit light having different polarization states, and if, taking the right eye as an example, the first anisotropic partially-reflective film 12 and the polarizer for the right eye can transmit p polarized light while the second anisotropic partially-reflective film 13 can transmit s polarized light, then the half wave plate is arranged between the second anisotropic partially-reflective film 13 and the polarizer for the right eye, as shown in FIG. 4. Thus, p polarized light of external light will only be remained after the external light passes through the polarizer for the right eye, and the p polarized light is rotated by the half wave plate into s polarized light which is transmitted to the right eye via the second anisotropic partially-reflective film 13. FIG. 5 is a structural schematic diagram of an optical medium for a left eye, corresponding to that shown in FIG. 4, where the optical medium for the left eye and the optical medium for the right eye are bilateral symmetry with respect to the bridge of the nose of the viewer as a center. Similarly, when the first anisotropic partially-reflective film 12 can transmit s polarized light, and the second anisotropic partially-reflective film 13 and the polarizer for the right eye can transmit p polarized light, the half wave plate may be arranged between the first anisotropic partially-reflective film 12 and the polarizer for the right eye, as shown in FIG. 3, thereby enabling 3D video viewing.

Figure 6:
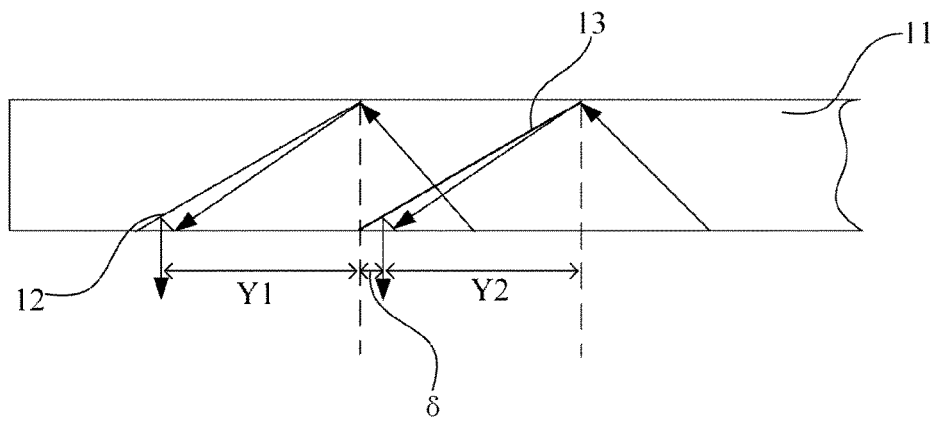
FIG. 6 is a schematic diagram showing a light path principle according to an embodiment of the present disclosure.
Figure 7:
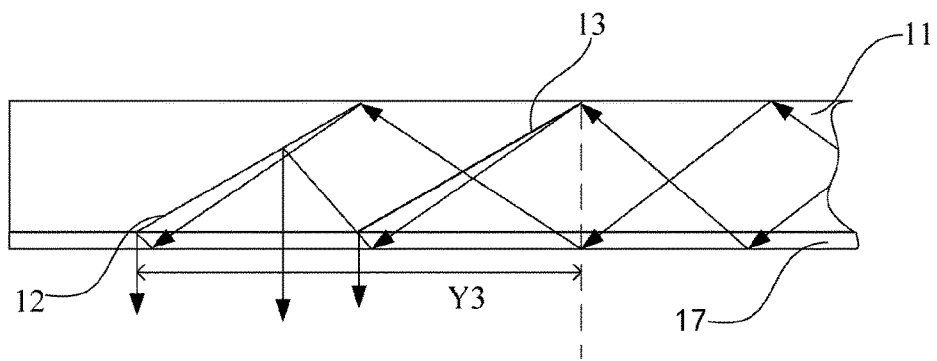
FIG. 7 is a structural schematic diagram of an optical medium according to a still further embodiment of the present disclosure.

Further referring to the light path principle diagram shown in FIG. 6, since it is not possible for the light reflected by the total reflection film 14 to be completely parallel to the first anisotropic partially-reflective film 12 and the second anisotropic partially-reflective film 13 during propagation of light, there is a viewing field gap δ between effective viewing fields (Y1 and Y2) formed by the first anisotropic partially-reflective film 12 and the second anisotropic partially-reflective film 13. In order to avoid the viewing field gap δ, according to a further embodiment of the present disclosure, as shown in FIG. 7, the optical medium further includes a base plate 17 arranged on the outer side of the lower interface 112 of the substrate. With the base plate 17, the formed effective viewing field Y3 is a complete viewing field. The thickness of the base plate will not limited in embodiments of the present disclosure, as long as it can compensate for the viewing field gap δ.

In the following, exemplary embodiments of the present disclosure will be described in detail by describing the imaging principle of an input source signal for the optical medium and implementation of polarized 3D video viewing with reference to the light path diagram shown in FIG. 3, wherein the optical medium for the right eye will be described (the optical medium for the left eye is similar to the optical medium for the right eye, with bilateral symmetry arrangement of respective reflective films with respect to the bridge of the nose as a center), the first polarization state is a p polarization state, the second polarization state is an s polarization state, the polarizer has a p polarization state (that is, can filter out light having an s polarization state), and the p polarized light can be rotated by the half wave plate into s polarized light.

The input source signal for the optical medium is inputted through the total reflection film 14, and arrangement of the total reflection film 14 may be determined according to a position of the input source signal. The position shown in FIG. 3 is only illustrative and not sole. The input source signal is non-polarized light ps, may come from a non-polarized video source (for example, OLED (Organic Light-Emitting Diode) or the like), may contain information about or attached to external environment scene at the environment scene side S1, for example, when the environment scene is a cinema screen, and may include captions or advertisements in various languages or the like.

The non-polarized light ps may be reflected by the total reflection film 14 into the substrate 11, and may propagate within the substrate 11 via the total reflection film 14 as long as an angle α between the total reflection film 14 and the substrate 11 is appropriately set (exemplarily, the angle α is 26° in FIG. 3, but it is not limited to this in the present disclosure). When the non-polarized light ps reaches the second anisotropic partially-reflective film 13, light having the s polarization state is reflected; on the other hand, light having the p polarization state is transmitted. The non-polarized light ps will be divided into first reflected s polarized light and first outgoing p polarized light after reaching the second anisotropic partially-reflective film 12, and the first reflected s polarized light propagates to the viewer (e.g., to a human eye). The first outgoing p polarized light will be reflected to the viewer when being transmitted to the first anisotropic partially-reflective film 12. In the prior art intelligent glasses using an optical prism, there is only one layer partially-reflective film, its viewing field angle is smaller, and its thickness is larger; two layers of partially-reflective films are applied in the present disclosure, thus a larger viewing field angle can be obtained without increasing the thickness. Further, when light is transmitted to the second anisotropic partially-reflective film 13, only light having the second polarization state is reflected to the viewer, and light having the first polarization state is transmitted to the first anisotropic partially-reflective film 12 and reflected to the viewer, thus light having different polarization states may be reflected to the viewer after being separated by the optical medium according to embodiments of the present disclosure, thereby avoiding generation of a double image.

The above description has been made with respect to the imaging principle for the present disclosure, and in the following, a function of differentiating polarization states of external light which is provided for enabling 3D viewing at the environment scene side S1, will be described. Assuming that an application environment is 3D cinema (it is noted that the present disclosure is not limited to the application environment and application situations described herein), s polarized light emitted from a first projector corresponds to an image for the right eye, and p polarized light emitted from a second projector corresponds to an image for the left eye. In FIG. 3, the ambient light contains components having two polarization states, and a polarizer 16 is similar to the common polarized 3D glasses and has a polarization direction for the left eye and a polarization direction for the right eye orthogonal to each other. In FIG. 3, after the ambient light passes through the polarizer 16, s polarized light component is filtered out such that the image only contains p polarized light component, which is directly transmitted through the second anisotropic partially-reflective film 13 to the viewer, and the p polarized light is rotated by half wave plate 15 by 90° to form s polarized light, which is transmitted through the first anisotropic partially-reflective film 12 to the viewer. It will be appreciated that the polarized light may be rotated by the half wave plate 15. Since linearly polarized light is vertically incident to the half wave plate, transmitted light is still linearly polarized light; assuming that an angle between a vibration plane and a principal section of crystal is θ during incidence of light, then the vibration plane of the transmitted linearly polarized light is rotated by an angle of 2θ from its original orientation. In the present disclosure, the angle between the vibration plane and the principal section of crystal is set to 45° during incidence of light, thus the vibration plane of the transmitted linearly polarized light is rotated by an angle of 90° from its original orientation, thereby transmitted linearly polarized light can be transmitted through the first anisotropic partially-reflective film 12.

Of course, the above embodiments are only described exemplarily by taking the p polarized light and s polarized light perpendicular to each other as an example, and the present invention may also be implemented in embodiments where two polarized light having other different polarization states are applied. In one preferred embodiment, when the angle between the total reflection film 14 and the substrate 11 is 26°, an angle β1 between the first anisotropic partially-reflective film 12 of the optical medium for the right eye and the substrate 11 is −26°, and an angle β2 between the second anisotropic partially-reflective film 13 and the substrate 11 is −26°. Of course, the angle between the total reflection film 14 and the substrate 11, the angle between the first anisotropic partially-reflective film 12 and the substrate 11, and the angle between the second anisotropic partially-reflective film 13 and the substrate 11 described above are only preferred examples, other ranges of such angles that light reflected by the total reflection film 14 can enter the first anisotropic partially-reflective film 12 and the second anisotropic partially-reflective film 13 may also implemented in the present disclosure.

Figure 8:
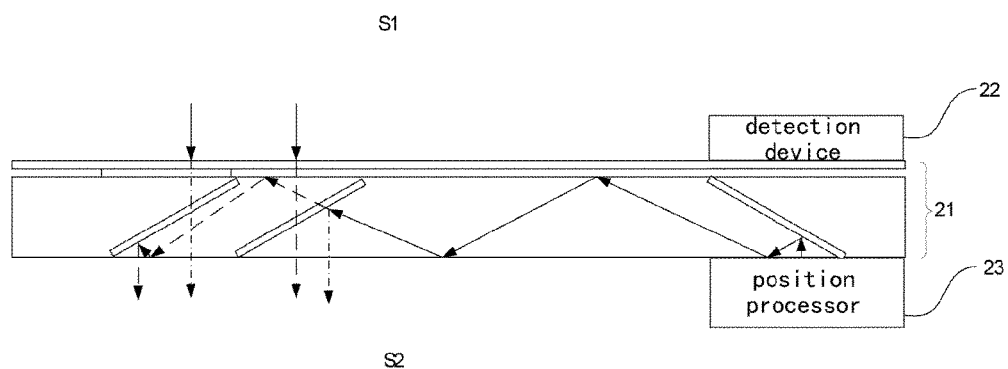
FIG. 8 is a structural schematic diagram of glasses according to an embodiment of the present disclosure.

An embodiment of the present disclosure further provides glasses; as shown in FIG. 8, the glasses comprise: an optical medium assembly 21 provided according to any one of above embodiments (this is only exemplary, an optical medium for general viewing may be also possible), a detection device 22, and a position processor 23, wherein:

the detection device 22 is configured to detect a screen position based on a screen image; and the position processor 23 is configured to generate position information of an imported content based on the screen position detected by the detection device so as to output the imported content to the optical medium based on the position information, a position of the imported content being fixed relative to the screen position.

For the optical medium provided according to the embodiments described above, the imported content may be imported in a form of an input source signal to the optical medium via the total reflection film, wherein the detection device 22 may be a photosensor mounted in front of eyes and facing the screen, such as CCD (Charge-Coupled Device), CMOS (Complementary Metal Oxide Semiconductor) or the like. Positions of the detection device 22 and the position processor 23 shown in FIG. 8 are only illustrative, and are not representative of all of technical solutions to be protected in the present invention, and the detection device and the position processor may be disposed at other suitable positions enabling implementation of the present invention.

Since the optical medium provided according to the above embodiments is utilized in the glasses according to the embodiments of the present disclosure, the viewing field angle of the glasses can be increased without increasing the thickness of the device, and meanwhile, the position information of imported content of the optical medium is generated based on the detected screen position such that a position of the imported content is fixed relative to the screen position, thereby preventing a relative movement between the imported content (e.g., captions, advertising images, or the like) and the screen, which will otherwise adversely affect viewing experience.

Optionally, the detection device 22 is configured to obtain the screen position information based on brightness of the screen image and brightness of a non-screen portion.

Optionally, the position processor 23 is configured to acquire screen coordinates based on the screen position and to generate the position information of the imported content based on the screen coordinates, wherein the position information contains display coordinates of the imported content, which correspond to preset coordinate values of the screen coordinates.

In an example, an external light emitting image, for example, a light emitting image in a rectangular screen in case of 3D cinema, may be acquired by the photosensor, screen coordinates may be represented in form of coordinates (x, y) by calculating a position of a central light emitting point of the screen in the photosensor, and display coordinates of the imported content may be set in the position processor 23 of the glasses based on the screen coordinates; for example, when the imported content is a caption, a horizontal coordinate of a center of the caption is set to be the same as that of a center of the external screen, while a longitudinal coordinate of the center of the caption is displaced downwards so as to be consistent with that of a center of a lower boundary of the screen. Of course, the imported content is not limited to the caption, and may include one or more of a caption and an image.

Figure 9:
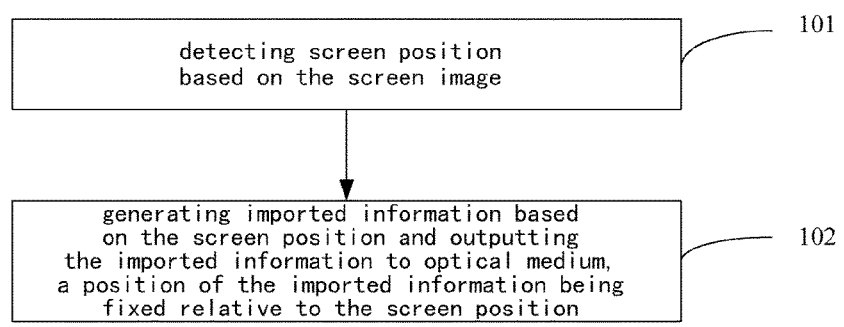
FIG. 9 is a schematic diagram of a flow chart showing an imaging method for glasses according to an embodiment of the present disclosure.

An embodiment of the present disclosure further provides an imaging method for glasses, as shown in FIG. 9, the method comprises following steps of:

101: detecting the screen position of the screen image; and

102: generating the position information of the imported content based on the screen position so as to output the imported content to the optical medium of the glasses based on the position information, a position of the imported content being fixed relative to the screen position.

With the imaging method provided according to the embodiment of the present disclosure, the position information of imported content of the optical medium can be generated based on the detected screen position such that a position of the imported content is fixed relative to the screen position, thereby preventing a relative movement between the imported content (e.g., captions, advertising images, or the like) and the screen, which will otherwise adversely affect viewing experience.

Further, the step 101 may include obtaining the screen position information based on brightness of the screen image and brightness of a non-screen portion.

The step 102 may include acquiring screen coordinates based on the screen position, and generating the position information of the imported content based on the screen coordinates, wherein the position information contains display coordinates of the imported content, which correspond to preset coordinate values of the screen coordinates.

In an example, the imported content at least includes one or more of a caption and an image.

The above described contents are only exemplary embodiments of the present disclosure, and the scope of the present invention is not limited to those. Various changes or modifications, which may be easily envisaged by those skilled in the art in these embodiments without departing from the principles and spirit of the present disclosure, are intended to be covered within the scope of the present invention. Therefore, the scope of the present invention is defined in the claims and their equivalents.

What is claimed is:

1. Glasses, comprising:
    an optical medium, comprising:
        a substrate having an upper interface and a lower interface parallel to each other;
        a first anisotropic partially-reflective film and a second anisotropic partially-reflective film being parallel to each other tilted between the upper interface and the lower interface of the substrate; and
        a total reflection film arranged within the substrate and tilted in a direction opposite to that of the first and second anisotropic partially-reflective films;
        wherein the first anisotropic partially-reflective film is configured to totally reflect light having a first polarization state and to transmit light having a second polarization state different from the first polarization state, and the second anisotropic partially-reflective film is configured to transmit light having the first polarization state and to totally reflect light having the second polarization state; and
        wherein the total reflection film is arranged to receive incident light and totally reflect the incident light, such that the incident light is transmitted within the substrate to the first anisotropic partially-reflective film and the second anisotropic partially-reflective film through reflection on an inner side of the upper interface and an inner side of the lower interface of the substrate;
    a detection device configured to detect a screen position based on a screen image; and
    a position processor configured to generate position information of an imported content based on the screen position detected by the detection device so as to output the imported content to the optical medium based on the position information, a position of the imported content being fixed relative to the screen position.

2. The glasses according to claim 1, wherein the detection device is configured to obtain the screen position based on brightness of the screen image and brightness of a non-screen portion.

3. The glasses according to claim 1, wherein
    the position processor is configured to acquire screen coordinates based on the screen position and to generate the position information of the imported content based on the screen coordinates,
    wherein the position information comprises display coordinates of the imported content, which correspond to preset coordinate values of the screen coordinates.

4. The glasses according to claim 1, wherein the imported content at least comprises one or more of a caption and an image.

5. An imaging method for the glasses according to claim 1, comprising:
    detecting the screen position based on the screen image; and
    generating the position information of the imported content of the glasses based on the screen position so as to output the imported content to the optical medium of the glasses based on the position information, a position of the imported content being fixed relative to the screen position.

6. The method according to claim 5, wherein detecting the screen position based on the screen image comprises:
    obtaining the screen position based on brightness of the screen image and brightness of a non-screen portion.

7. The method according to claim 5, wherein generating the position information of the imported content based on the screen position comprises:
    acquiring screen coordinates based on the screen position; and
    generating the position information of the imported content based on the screen coordinates,
    wherein the position information comprises display coordinates of the imported content, which correspond to preset coordinate values of the screen coordinates.

8. The method according to claim 5, wherein the imported content at least comprises one or more of a caption and an image.

9. The glasses according to claim 1, further comprising:
    a half wave plate arranged on an outer side of the upper interface of the substrate, a projection of the first anisotropic partially-reflective film or the second anisotropic partially-reflective film on the upper interface coinciding with the half wave plate; and
    a polarizer arranged on the half wave plate and covering the outer side of the upper interface.

10. The glasses according to claim 2, wherein a projection of the first anisotropic partially-reflective film on the upper interface of the substrate does not coincide with that of the second anisotropic partially-reflective film on the upper interface of the substrate.

11. The glasses according to claim 2, wherein
    an angle of inclination of the total reflection film with respect to the lower interface of the substrate is 26°, and an angle of inclination of the first and second anisotropic partially-reflective films with respect to the lower interface of the substrate is −26°; or
    the angle of inclination of the total reflection film with respect to the lower interface of the substrate is −26°, and the angle of inclination of the first and second anisotropic partially-reflective films with respect to the lower interface of the substrate is 26°.

12. The method according to claim 5, wherein the detection device is configured to obtain the screen position based on brightness of the screen image and brightness of a non-screen portion.

13. The method according to claim 5, wherein
    the position processor is configured to acquire screen coordinates based on the screen position and to generate the position information of the imported content based on the screen coordinates,
    wherein the position information comprises display coordinates of the imported content, which correspond to preset coordinate values of the screen coordinates,
    wherein the imported content at least comprises one or more of a caption and an image.

14. The method according to claim 6, wherein the imported content at least comprises one or more of a caption and an image.

15. The method according to claim 7, wherein the imported content at least comprises one or more of a caption and an image.

16. The glasses according to claim 1, wherein the optical medium further comprises a base plate arranged on an outer side of the lower interface of the substrate.

* * * * *